Patented June 24, 1941

2,247,209

UNITED STATES PATENT OFFICE 2,247,209

METHOD OF MAKING MOLDABLE LIGNO-CELLULOSIC MATERIAL AND PRODUCT THEREOF

Arlie W. Schorger, Madison, Wis., assignor to Burgess Cellulose Company, Freeport, Ill., a corporation of Delaware No Drawing. Application August 26, 1939, Serial No. 292,075

13 Claims. (Cl. 260—9)

This invention relates to improved methods for treating natural lignocellulosic material, such as sawdust, corncobs, bagasse, etc., so as to render it suitable for hot-molding into hard, thermoplastic, resin-like products. The invention also relates to the products produced by such methods.

It is an object of the invention to provide improved methods for making such plastic lignocellulose products, which methods are economical and result in products having improved plastic flow and strength.

In my co-pending joint application Serial No. 134,272, filed April 1, 1937, now Patent No. 2,196,277, a method is disclosed in which a comminuted natural lignocellulosic material, such as wood, corncobs, straw, bagasse, cornstalks, etc., is cooked with water at 50 to 205 pounds per square inch gauge pressure (148° C. to 200° C.) for from ½ to 3 hours, and the cooked product washed with water and dried and then mixed with from approximately 1% to 10% of aniline. A product is obtained which molds readily at temperatures of 100° C. to over 200° C. and pressures of 1600 to 5000 pounds per square inch into a hard, structureless, glossy resin-like product.

In accordance with the present invention, it has been discovered that decidedly superior results are obtained if the cooked lignocellulose after being washed and dried is heated with the added aniline at elevated temperatures, from 100° to 225° C., prior to molding. The aniline in an amount approximately from 1% to 15% based on the weight of the dry lignocellulose, is thoroughly mixed with the lignocellulose, and the mixture heated in a closed container, preferably at 170° C. This heating of the mixture prior to the molding operation functions to fix the aniline upon the lignocellulose whereby little or none of it is lost by evaporation during the molding operation.

It has been found further that the efficiency of the aniline fixation is improved and the fixing can be performed in a shorter time if a small amount of a suitable catalyst, such as copper sulphate, is added to the mixture prior to the heating operation. As an example, when the dried lignocellulosic material is mixed with 10% of its weight of aniline and 0.1% of copper sulphate and the mixture heated at 170° C. for one hour, the aniline is fixed completely. Suitable catalysts are the oxides and salts of the metals vanadium, chromium, manganese, iron, cobalt, nickel and copper. The time and temperature employed in the fixing operation depends upon the amount of aniline used. As the amount of aniline is increased, the time, or the temperature, or both should be increased to obtain complete fixation. It is obvious that such fixation results in great economy of operation and the maximum utilization of the aniline.

It is customary to add small amounts of a metallic stearate, such as zinc stearate, to the plastic lignocellulosic material to prevent its sticking to the mold. In accordance with the present invention, the release-promoting agent is caused to serve the function of a catalyst also, by employing a stearate of a metal mentioned heretofore, such as copper stearate: As a specific example, 1% of copper stearate, based on the weight of the lignocellulosic material, is dissolved in the aniline and the solution is added to the dried lignocellulosic material and the mixture is heated in a rotating digester.

The resulting lignocellulose-aniline compound possesses improved thermoplasticity and may be molded readily under heat and pressure to produce hard, resin-like, water-resistant products. The water resistance is increased materially over that of prior lignocellulose plastics of this character. A suitable plasticizer, such as water, aniline, furfural, or a phenol, may be admixed with the lignocellulose-aniline compound prior to the molding operation. Up to 10% of the plasticizer, based on the weight of the lignocellulose, usually is satisfactory. The plasticizer may be mixed with the aniline prior to the heating operation, instead of after, if desired. The use of carbanilide, thiocarbanilide, and similar compounds that on heating can produce aniline or its homologs falls within the spirit of this invention. The above compounds may also be used as plasticizers.

In accordance with this invention, it has been discovered that raw natural lignocellulose may be molded under heat and pressure in the presence of aniline. By natural lignocellulose is meant a lignocellulose which has not been given a treatment which alters it chemically from its natural condition. The term includes a natural lignocellulose which has been comminuted and washed and dried, but not one which has been subjected to a chemical processing or digestion or to the water-cooking operation described herein. Heretofore, it has been understood that lignocellulose must be subjected to one of the ordinary methods of hydrolysis, or to the water cooking operation described heretofore, in order to be rendered sufficiently thermoplastic to enable the production of hard, dense, water-resistant, resin-like products by hot-molding. In accordance with this invention, the aniline may be mixed with the comminuted natural lignocellulose in an amount up to approximately 15% of the lignocellulose, and the mixture subjected directly to hot-molding, but preferably the mixture is subjected to a heating operation at a temperature from 100° C. to 225° C. prior to the molding operation, to fix the aniline. This provides the two-fold advantage of conserving aniline and preventing the development of toxic aniline vapor during molding. A catalyst, such as described heretofore, may be added to the lignocellulose-aniline mixture before the heating operation to improve the fixation of the aniline. A lignin plasticizer such as furfural and the phenols, or a mixture of two or more of such plasticizers, may be added to the mixture before molding.

The natural lignocellulose is first comminuted to a size suitable for molding, and then preferably is washed with cold or hot water, and then dried. While the comminuted natural lignocellulose may be mixed with aniline and molded directly, as described heretofore, the washing operation improves the molding properties of the product.

The washed natural lignocellulose is dried and mixed with the aniline, and then subjected directly to the hot-molding operation, or to the heating operation described heretofore, followed by molding. The presence of up to approximately 10% of water increases the plasticity during molding.

The following are specific examples of methods of carrying out the present invention. It is understood that the examples are only illustrative and that additional modifications of the method may be made within the scope of the invention.

Example No. 1

Ash wood which has been comminuted to small particle size is cooked with an equal weight of water containing approximately 5% of caustic soda, based on the air dry weight of the wood, at a temperature of approximately 195° C. for one hour. Organic acids are freed from the wood during the cooking, and the caustic soda is added for the purpose of neutralizing these acids as they are liberated and making the mass substantially neutral at the end of the cook. Any suitable alkaline material may be used, but an excess should be avoided. In accordance with my copending joint application Serial No. 219,596, filed July 16, 1938, the neutralization of the acids as they are liberated improves the plasticity and strength of the product. The cooked material is washed thoroughly with water to remove the substances which have been rendered water soluble by the cooking operation, and is dried. It contains substantially all of its natural lignin content in its natural location on the cellulose. If it is not of a suitable fineness for molding, it may be comminuted further. A particle size of 60 mesh per inch is suitable. The lignocellulose is then mixed with an aqueous solution containing 0.1% copper sulphate, based on the weight of the lignocellulose, and is dried in an oven. It is then mixed with approximately 10% of aniline, and the mixture is heated for 1 hour at 170° C. in a closed container. The resulting lignocellulose-aniline composition is mixed with approximately 1% of zinc stearate and molded at a temperature of 180° C. and a pressure of 5000 pounds per square inch. The modulus of rupture is 7250 pounds per square inch and the water absorption is 1.02 after being submerged in water at room temperature for 24 hours.

Example No. 2

Natural (unwashed) dry aspen wood is comminuted and mixed with 10% of aniline and the mixture heated at 170° C. for one hour, and then molded under heat and pressure. The modulus of rupture is 8100 pounds per square inch and the water absorption 10.8%.

Example No. 3

Natural hemlock sawdust is washed with water, dried at 105° C., then mixed with approximately 10% of aniline and heated at 170° C. for one hour in a closed container. The mixture is then molded under heat and pressure. The modulus of rupture is 7250 pounds per square inch and the water absorption 2.70%.

Example No. 4

Natural ash wood is comminuted, washed and dried, then mixed with 10% of aniline and heated at 170° C. for one hour in a closed container. The mixture is then molded under heat and pressure. The modulus of rupture is 5200 pounds per square inch and the water absorption 2.30%.

Example No. 5

Natural white pine sawdust is washed with water and dried, and to it is added 7½% of aniline and 5% of water with thorough mixing. The mixture is molded (without preliminary heating) under heat and pressure. The modulus of rupture is 6630 pounds per square inch and the water absorption 7.0%.

I claim:

1. The method of claim 10 in which the mixture is heated in a closed container to prevent loss of aniline during heating.

2. The method of making a thermoplastic lignocellulose capable of being hot-molded into a hard, resin-like product, which comprises cooking a natural lignocellulose with water at a temperature and pressure sufficient to render said lignocellulose thermoplastic, washing said lignocellulose with water, drying said lignocellulose, mixing with said lignocellulose approximately 1% to 15% of aniline, based on the weight of said lignocellulose, and a catalyst from the group consisting of the oxides and salts of vanadium, chromium, manganese, iron, cobalt, nickel and copper, and heating said mixture outside the mold at approximately 100° C. to 225° C.

3. The method of making a thermoplastic lignocellulose capable of being hot-molded into a hard, resin-like product, which comprises cooking a natural lignocellulose with water at a temperature and pressure sufficient to render said lignocellulose thermoplastic, washing said lignocellulose with water, drying said lignocellulose, making an intimate mixture consisting essentially of said lignocellulose and approximately 1% to 15% of aniline, based on the weight of said lignocellulose, and heating said mixture outside the mold at from approximately 100° C. to 225° C. and mixing with said heated mixture a plasticizer for lignin.

4. A thermoplastic composition having the property of plastic flow under heat and pressure molding conditions of 180° C. and 5000 pounds per square inch respectively, with formation of hard, water-resistant, resin-like products, comprising a substantially moisture-free mixture consisting essentially of comminuted natural lignocellulose and approximately 10% to 15% of aniline based on the weight of said lignocellulose.

5. A thermoplastic composition having the property of plastic flow under heat and pressure molding conditions of 180° C. and 5000 pounds per square inch respectively, with formation of hard, water-resistant, resin-like products, comprising a substantially moisture-free mixture consisting essentially of comminuted natural lignocellulose, approximately 1% to 5% of aniline, based on the weight of said lignocellulose, and a catalyst from the group consisting of the oxides and salts of vanadium, chromium, manganese, iron, cobalt, nickel and copper.

6. The method of producing a thermoplastic lignocellulose capable of being hot-molded into a hard, resin-like product, which comprises making an intimate mixture consisting essentially of a natural lignocellulose and approximately 1% to 15% of aniline, based on the weight of said lignocellulose.

7. The method of producing a thermoplastic lignocellulose capable of being hot-molded into a hard, resin-like product, which comprises making an intimate mixture consisting essentially of a natural lignocellulose and approximately 1% to 15% of aniline and up to approximately 10% of a plasticizer for lignin, based on the weight of said lignocellulose.

8. The method of producing a thermoplastic lignocellulose capable of being hot-molded into a hard, resin-like product, which comprises washing a natural lignocellulose with water, drying said washed lignocellulose and making an intimate mixture consisting essentially of said dried lignocellulose and approximately 1% to 15% of aniline, based on the weight of said lignocellulose.

9. The method of producing a thermoplastic lignocellulose capable of being hot-molded into a hard, resin-like product, which comprises making a substantially moisture-free mixture consisting essentially of a natural lignocellulose, and approximately 1% to 15% of aniline, based on the weight of said lignocellulose, and heating said mixture at approximately 100° C. to 225° C.

10. The method of producing a thermoplastic lignocellulose capable of being hot-molded into a hard, resin-like product, which comprises washing a natural lignocellulose with water, drying said washed lignocellulose, making an intimate mixture consisting essentially of said dried lignocellulose and approximately 1% to 15% of aniline, based on the weight of said lignocellulose, and heating said mixture at approximately 100° C. to 225° C.

11. The method of producing a thermoplastic lignocellulose capable of being hot-molded into a hard, resin-like product, which comprises making a substantially moisture-free mixture consisting essentially of a natural lignocellulose, approximately 1% to 15% of aniline, based on the weight of said lignocellulose, and a catalyst from the group consisting of the oxides and salts of vanadium, chromium, manganese, iron, cobalt, nickel and copper, and heating said mixture at approximately 100° C. to 225° C.

12. The method of producing a thermoplastic lignocellulose capable of being hot-molded into a hard, resin-like product, which comprises making a substantially moisture-free mixture consisting essentially of a lignocellulose containing substantially all of the lignin occurring naturally therein and approximately 1% to 15% of aniline, based on the weight of said lignocellulose, and heating said mixture outside the mold at approximately 100° C. to 225° C.

13. The method of making a thermoplastic lignocellulose capable of being hot-molded into a hard, resin-like product, which comprises cooking a natural lignocellulose with water at a temperature and pressure sufficient to render said lignocellulose thermoplastic, water-washing and drying said lignocellulose, making an intimate mixture consisting essentially of said dried lignocellulose and approximately 1% to 15% of aniline, based on the weight of said lignocellulose, and heating said mixture outside the mold at approximately from 100° C. to 225° C.

ARLIE W. SCHORGER.

CERTIFICATE OF CORRECTION.

Patent No. 2,247,209. June 24, 1941.

ARLIE W. SCHORGER.

It is hereby certified that error appears in the printed specification of the above numbered patent requiring correction as follows: Page 3, first column, line 10, claim 5, for "5%" read --15%--; and that the said Letters Patent should be read with this correction therein that the same may conform to the record of the case in the Patent Office.

Signed and sealed this 26th day of August, A. D. 1941.

(Seal)

Henry Van Arsdale,
Acting Commissioner of Patents.